Figure 1:
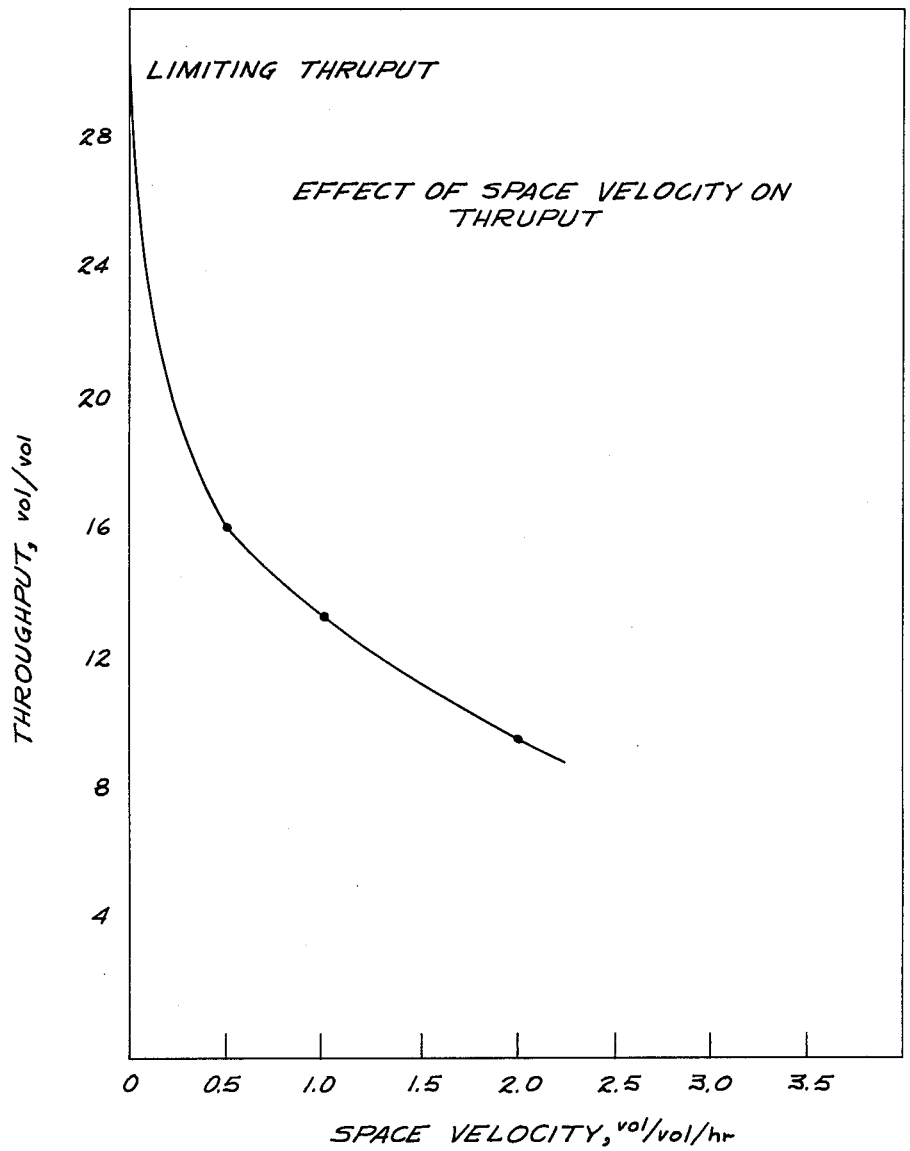

INVENTORS
ALFRED M. HENKE
HARRY C. STAUFFER

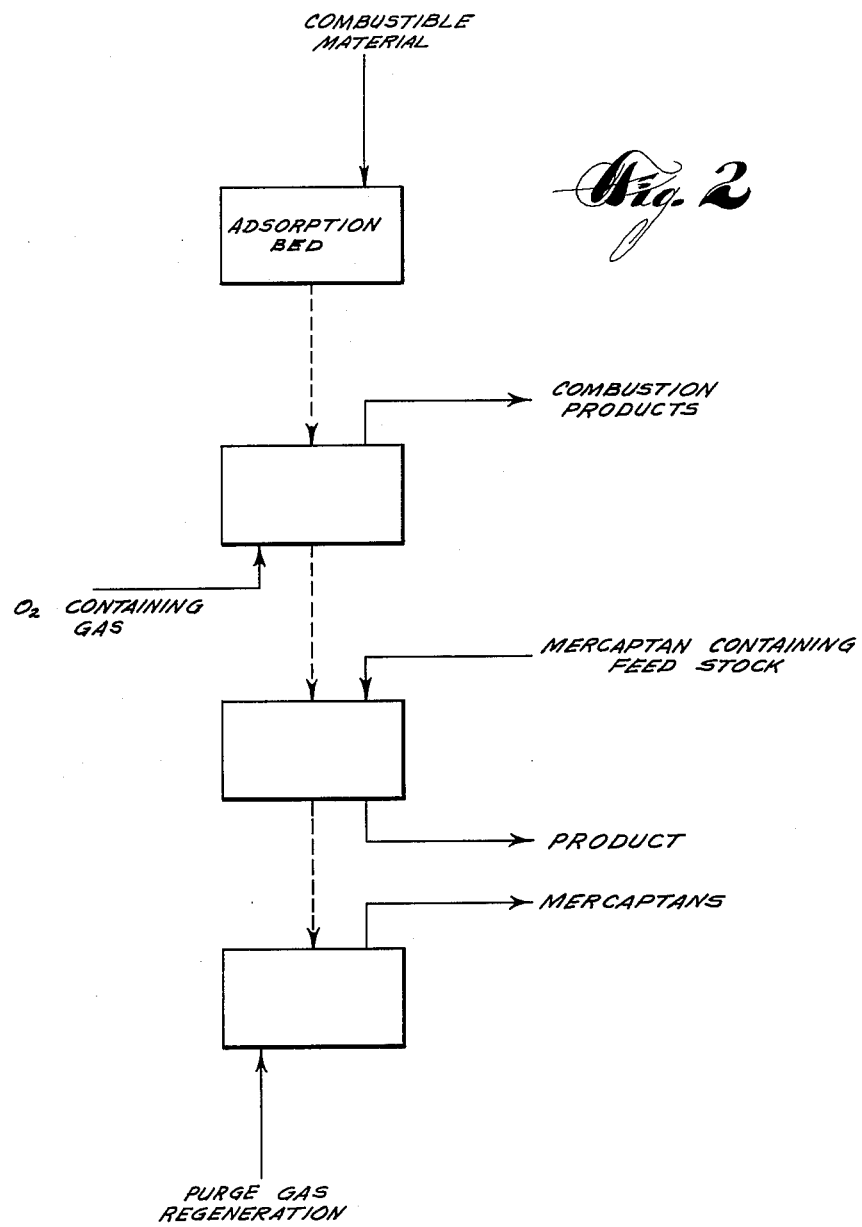

United States Patent Office

3,218,250
Patented Nov. 16, 1965

3,218,250
PROCESS FOR INCREASING THE ADSORPTIVE
CAPACITY OF ZEOLITES
Alfred M. Henke, Springdale, and Harry C. Stauffer, Cheswick, Pa., assignors to Gulf Research & Development Company, Pittsburgh, Pa., a corporation of Delaware
Filed Mar. 29, 1962, Ser. No. 183,671
20 Claims. (Cl. 208—250)

This invention relates to an improved process for the adsorption of mercaptans using zeolites.

The removal of mercaptan-type sulfur compounds from various petroleum fractions, for example light gasolines, is desirable for improving the properties of the petroleum fraction, for example, the odor, color and lead susceptibility. Various processes have been suggested for the removal of mercaptan-type sulfur compounds. Among the processes which have been suggested is one wherein the mercaptans are separated by selective adsorption on natural or synthetic zeolites. It has now been found that the capacity of these zeolites for the adsorption of mercaptans can be increased by a relatively simple procedure. The capacity of the zeolitic adsorbent is defined as the amount of mercaptans a given amount of adsorbent can remove before the desired breakthrough volume is reached.

In accordance with the invention, the capacity of zeolites for the adsorption of mercaptans is increased by a process which comprises burning the zeolites which contain a weight ratio of combustible material to zeolites of at least 0.4. In one preferred embodiment of this invention a sufficient amount of a heavy petroleum fraction is deposited on the zeolites to provide a ratio of combustible material to zeolites of at least 0.4, and thereafter said zeolites are subjected to burning.

The solid alumino silicate adsorbents which are employed in the practice of the invention are those crystalline dehydrated zeolites, natural or synthetic, having a well-defined physical structure which are known as "molecular sieves."

Chemically these molecular sieve zeolites are hydrous alumino-silicates generally containing one or more sodium, potassium, strontium, calcium, or barium cations, although zeolites containing hydrogen, ammonium, or other metal cations are also known. These zeolites have a characteristic three-dimensional, alumino-silicate anionic network, the cations neutralizing the anionic charge. Upon dehydration, the three-dimensional lattice network of the crystal is maintained, leaving intercommunicating channels, pores, or interstices of molecular dimensions within the crystal lattice. The cross-sectional diameter of such channels can vary, dehydrated three-dimensional zeolites having channels with various cross-sectional diameters being known. However, for each zeolite of this type, the narrowest cross-sectional diameter of the channels is a characteristic and is substantially uniform and fixed throughout the crystal. Thus, materials are available having channel diameters of substantially all 4 angstrom units, all 5 angstrom units, etc., as the case may be. It is, therefore, conventional in the art to characterize the crystalline, dehydrated, three-dimensional zeolites as molecular sieves of a definite channel diameter, for example, molecular sieves having a channel diameter of 5 angstrom units, or even more simply, 5 angstrom molecular sieves. Such molecular sieve adsorbents are presently available items of commerce marketed by Linde Air Products Company, 30 East 42nd Street, New York, New York. The preparation of these molecular sieve adsorbents is described more fully in U.S. Patent 2,882,243 to Robert M. Milton. The preferred zeolite of this invention is a "13X" molecular sieve marketed by Linde. U.S. Patent 2,983,670 to Seubold, Jr., indicates the "X" type zeolite has a relatively uniform pore diameter within the range of about 11 to 14° Angstrom. For the manner of preparation of the "X" zeolites, reference to made to U.S. Patent 2,882,244 to Robert M. Milton which describes the preparation of several different types, any of which may be used herein.

In accordance with the teachings of this invention the capacity of zeolites for the adsorption of mercaptans can be increased by depositing on the zeolites sufficient combustible material so that the weight ratio of combustible material to zeolites is at least 0.4, and thereafter burning the zeolites. The deposition of combustible material followed by burning of the sieves may be in the nature of a pretreatment of the zeolites which are intended for use in a process for the separation of mercaptans, or the zeolites may be ones previously employed in adsorption processes.

Any combustible material may be employed provided the material or the products of combustion do not adversely react with the zeolites. It is preferred that an organic material be employed, and still more preferred that a heavy organic material be employed which is substantially non-volatile at about 1000° F. and atmospheric pressure in order to prevent excessive loss of the combustible material with the purge gas during the burning operation. Particularly preferred combustible materials are the high molecular weight petroleum fractions, such as lubricating oils.

The combustible material may be deposited on the zeolites in any suitable manner, but it is preferred that the combustible material be deposited as uniformly as possible on the zeolites. When the combustible material is a liquid, one suitable method is to percolate the combustible material down through a bed of zeolites. If the liquid combustible material is of high molecular weight, it may suitably be diluted with a lower molecular weight material for ease of distribution through the bed. Sufficient combustible material should be percolated through the bed so that the weight ratio of combustible material to zeolites is at least 0.4. When the weight ratio of combustible material to zeolites is less than about 0.4, it has been found that no increase in capacity on the zeolites for mercaptans occurs after burning the zeolites. It is preferred that the weight ratio of combustible material to zeolites be between 0.5 and 0.8 with still more preferred ratios between 0.55 and 0.65. The deposition of combustible material so that the weight ratio of combustible material to sieves is greater than 0.8 appears to provide no additional benefits.

The burning of the zeolites may be by any suitable means. The temperature of burning must be so controlled, however, so as not to exceed the thermal stability of the zeolites. The thermal stability of the synthetic zeolitic materials, such as the molecular sieves and the microtraps mentioned above, is about 1100° F. It is preferred, therefore, that the temperature of burning of the sieves be so controlled so as not be exceed a temperature of about 1100° F. This temperature of burning may be controlled in any suitable manner such as, for example, by diluting the oxidation gas with an inert gas. Any gas containing free molecular oxygen can be employed as the oxidant. Examples of suitable oxidation gases include air or air diluted with further amounts of nitrogen.

While it is not known why the zeolites increase in capacity for the adsorption of mercaptans after a burning treatment as defined above, it is known that burning is essential, for calcination of the zeolites in a stream of nitrogen for six hours at 1000° F. was unsuccessful in increasing the capacity of zeolites for the adsorption of mercaptans.

Any suitable pressure may be employed during the burning operation. Atmospheric pressure is, of course, preferred for economic reasons, but pressures above and below atmospheric may be employed successfully. Higher burning pressures may be desirable in those instances where a lighter combustible material is employed in order in order to reduce losses due to vaporization.

When the zeolites are burned off in accordance with the method of the invention, they are then ready for use or reuse in the absorption of mercaptans.

The charge stocks for treatment by the process of this invention may be any material containing mercaptans, for example, petroleum fractions and materials derived from the destructive hydrogenation of coal. If is preferred that the charge stock be a mercaptan-containing petroleum fraction. By a mercaptan-containing petroleum fraction is meant a whole crude or a fraction thereof which contains mercaptans. It is particularly preferred that the charge stock be a light petroleum fraction boiling between —65° to 400° F. and includes full range gasolines, natural gasolines and relatively light hydrocarbon fractions, such as butane, isopentane and the like. The process of this invention is particularly advantageous in treating light gasolines boiling in the range from about —44° to 180° F. which materials comprise predominantly hydrocarbon compounds of from about three to six carbon atoms with only minor amounts of lighter and heavier hydrocarbons. Furthermore, it has been found that certain types of compounds found in petroleum fractions tend to be more strongly adsorbed on the zeolites than mercaptans and, therefore, such charge stocks require much higher zeolite to feed ratios to effect a separation of mercaptans. It is, therefore, preferred that the concentration of compounds which are more strongly adsorbed than mercaptans be kept to a minimum. Unsaturated compounds represent an example of the type of compounds which interfere with the adsorption of mercaptans. By an unsaturated compound is meant any hydrocarbon containing a triple or a double bond. Examples of such compounds include acetylenes, aromatics and olefins. By an olefin-type compound is meant a mono olefin, diolefin or cyclic olefin. Specific examples of undesirable unsaturated compounds include 2-butyne; benzene; butylbenzene; naphthalene; cyclohexene; hexene-1; pentene-2; and styrene. It is preferred, therefore, that the charge stock contain less than about 12% total unsaturates with the more preferred charge stocks containing less than 6% total unsaturates with the still more preferred charge stocks containing less than 1% total unsaturates.

Any adsorption temperature may be employed. The lower adsorption temperature is limited only by the freezing point of the charge stock. The upper temperature is limited by the decomposition of the materials being adsorbed or the decomposition of the adsorbent itself. Lower temperatures of adsorption are preferred since higher throughputs are achieved before regeneration of the adsorbent is required. Temperatures within the range of about —30° to 300° F. may, therefore, be employed. It is preferred, however, that temperatures from about 0° to 180° F. be employed, while it is still more preferred to employ temperatures from about 30° to 100° F. While the adsorption of sulfur compounds may take place with the charge stock either in the vapor or the liquid state, it is preferred to maintain the charge stock in the liquid phase during the adsorption operation. Therefore, the pressure during the adsorption operation is maintained sufficiently high so as to exceed the vapor pressure of the charge stock at the operating temperature.

In simple fixed bed operation the mercaptans undergoing adsorption are removed continuously from the charge stock and accumulate within and on the adsorbent. In a typical adsorption operation the effluent is free of mercaptans at the start of the cycle. At some point in the cycle, depending on operating conditions, such as temperature, flow rate and adsorption column design, mercaptans begin to appear in the effluent. After this the concentration of mercaptans in the effluent from the adsorption operation gradually increases. Continued operation results in an increasing amount of mercaptans in the effluent until the adsorption column effluent reaches the charge stock concentration. The point in the effluent concentration history at which the mercaptan concentration reaches a predetermined desired level is termed the breakthrough time or volume. The breakthrough volume can be predetermined so that sulfur is removed to a desirable extent and the effluent hydrocarbon stream meets a predetermined specification.

The volume of charge stock which can be treated per volume of adsorbent before the breakthrough volume is reached is termed the throughput. As noted above, the capacity of the zeolitic adsorbent is defined as the amount of mercaptans a given amount of the adsorbent can remove before the desired breakthrough volume is reached. Throughput at the breakthrough volume can therefore, be a direct measure of the capacity of the adsorbent. Throughput will, of course, depend to a large extent on the nature of the charge stock and the extent of removal of sulfur compounds which is desired. It is desirable, of course, to obtain as high a throughput as possible before it becomes necessary to regenerate the adsorbent. It has been found that increased throughputs may be achieved by operating at lower adsorption temperatures with the feed in the liquid phase and also by operating at the proper space velocity. In general, the liquid hourly space velocity, that is, the liquid volume of charge stock per volume of adsorbent per hour which may be employed may vary over a wide range, for example, from about 0.1 to 20 or more with preferred liquid hourly space velocities depending to a large extent on the nature of the charge stock. For example, it has been found that when light hydrocarbons, such as propane, containing small amounts of sulfur compounds are treated, preferred space velocities are between 1 and 15, whereas, when certain natural gasolines containing about 580 p.p.m. of mercaptan sulfur are treated, the preferred space velocities are between about 0.1 and 3 with still more perferred space velocities between 0.3 and 1. Thus, the curve in FIGURE 1 illustrates the effect of space velocity on throughput for a natural gasoline containing about 580 p.p.m. of mercaptan sulfur. It should be understood that the curve in FIGURE 1 is typical of the effect of space velocity on throughput, but the absolute numbers for space velocity and throughput are valid only for the particular charge stock for which the curve was obtained. The curve in FIGURE 1 was obtained by treating at a temperature of 80° F. and a pressure of one atmosphere a gasoline petroleum fraction containing about 580 p.p.m. of mercaptan sulfur to produce an effluent gasoline containing not more than 6 p.p.m. of mercaptan sulfur. As is seen from the typical curve, as the space velocity increases the throughput of the process rapidly decreases.

After the desired breakthrough volume is reached, that is, when the concentration of mercaptans in the effluent from the adsorption operation increases to a value approaching the maximum permissible limit to meet required specifications, introduction of the feed to the adsorption zone is discontinued and the molecular sieve adsorbent is desorbed and regenerated for reuse. Desorption and regeneration of the adsorbent may be accomplished in any suitable manner, such as, for example, by purge gas stripping, displacement and thermal-pressure swing techniques. Some compounds of the feed stock are so strongly adsorbed on the zeolites that eventually a burn-off type regeneration is needed to bring the adsorptive capacity of the zeolites back at least to their original level.

In accordance with this invention the adsorptive capacity of zeolites for mercaptans can be increased by burning the zeolites which have a weight ratio of combustible material to zeolites of at least 0.4. If required, therefore, sufficient combustible material should be deposited on the zeolites before burning to bring the weight ratio of combustible material to zeolites to at least 0.4.

FIGURE 2 of the drawings sets forth in block diagram a preferred embodiment of the practice of this invention. A combustible material, such as a lubricating oil, is deposited on the zeolite bed. A sufficient amount of the combustible material is deposited on the bed of zeolite so that the weight ratio of combustible material to zeolites is at least 0.4. It is perferred, of course, that the combustible material be deposited evenly throughout the bed of zeolites. Burning of the zeolites then occurs by introducing preferably at the bottom of the zeolite column an oxygen-containing gas. The oxygen-containing gas is sufficiently diluted with an inert gas, such as nitrogen, so that the maximum temperature of the hot spot in the bed does not exceed a temperature of about 1100° F. After the hot spot has burned through the bed, the bed is cooled down and is then ready for the addition of a mercaptan-containing feed stock. The contacting of the combustible material and the mercaptan-containing feed stock with the zeolites can be effected by various means. For example, liquid combustible material or mercaptan-containing feed stock may be contacted with the solid particle zeolites preferably in the form of a fixed bed, a moving bed or a fluidized bed and the combustible material or mercaptan-containing feed stock may pass in direct, concurrent or countercurrent contact with the zeolite adsorbent. The zeolite adsorbent is preferably maintained in a finely pelletized or extruded form, such as $\frac{1}{16}$ to $\frac{1}{4}$ inch average maximum diameter.

The invention will be further described with reference to the following specific examples.

A bed of fresh $\frac{1}{16}$ inch pellets of a "13X" molecular sieve was activated by heating to 650° F. while charging the bed with a dry stream of nitrogen at 113 space velocity measured at STP. The molecular sieve adsorbent employed is marketed by Linde Air products Company, 30 East 42nd Street, New York, New York, under the name "13X molecular sieve." As noted earlier, the "13X" molecular sieve has a relatively uniform pore diameter within the range of 11 to 14° Angstrom. The bed was then cooled to the operating temperature by continuing the flow of nitrogen through the bed. When the bed was at a temperature of about 80° F., the nitrogen flow was stopped and the charge stock was an 8 RVP fraction of natural gasoline whose inspections are given in Table I below.

TABLE I

Inspections of an 8 RVP gasoline:
  Gravity, ° API _____ 76.7.
  Sulfur, p.p.m.:
    Total _____ 836.
    Mercaptan _____ 581.
    Elemental _____ <5.
    Disulfides _____ <10.
    Hydrogen sulfide _____ <10.
  Doctor test _____ Fail.
  Hydrocarbon type analysis:
    Saturates _____ 96.5.
    Unsaturates:
      Olefins _____ 0.3.
      Aromatics _____ 3.2.

To insure a liquid full bed during adsorption, the bottom of the bed was sealed until sufficient charge stock had been pumped downflow to cover the bed. During this time the top of the bed was vented to promote the escape of trapped gas. When the bed was full the vent was closed and the pressure in the column containing the bed was allowed to increase to 50 p.s.i.g., whereupon a pressure controller became operative and permitted effluent to flow from the bottom of the column.

*Example 1*

The chage stock was continued at the rate of 0.95 liquid volumes of charge stock per volume of molecular sieves per hour while the column temperature was maintained at 100° F. The effluent was continuously monitored and was found to reach a mercaptan level of five p.p.m. at a throughput of about 3.5. An effluent containing five p.p.m. of mercaptan sulfur was chosen as an endpoint since effluents containing more than five p.p.m. sulfur would not pass the doctor test for sweetness.

The bed was depressured slowly (20 minutes) to atmospheric pressure. Dry nitrogen was then readmitted to the top of the bed at a 56 STP space velocity, and the bed charged for 40 minutes with nitrogen to remove any entrained and readily desorbed liquid.

The column was then heated to 700° F. and dry natural gas admitted to the bottom of the column at a 226 STP space velocity. This treatment was continued for five hours after which the column was allowed to cool under natural gas flow to 80° F. The 8 RVP natural gasoline was again charged through the column of sieves at a space velocity of 0.95 and a temperature of 100° F. Again a throughput of 3.5 was achieved before an effluent containing more than five p.p.m. of mercaptans was obtained.

*Example 2*

A mixture of 90% by weight of the 8 RVP natural gasoline and 10% by weight of a lubricating oil was charged at a temperature of 100° F. and a liquid hourly space velocity of 0.95 through a column of "13X" sieves which had been subjected to several mercaptan removal and natural gas regeneration cycles. This amounted to a weight ratio of combustible material (lubricating oil) to sieves of 0.6. Typical inspections of the lubricating oil are shown in Table II below. The lubricating oil was substantially non-volatile at 1000° F. and atmospheric pressure.

TABLE II

Lubricating oil:
  Gravity: ° API _____ 30.6
  Viscosity: SUU: Sec 100° F. _____ 298
  Pour point, ° F. _____ +5
  Flash point, P–M, ° F. _____ 460

The bed was slowly depressured and thereafter charged with dry nitrogen to remove entrained liquids. The sieves were then burned with air while the temperature of the hot spot was controlled so as not to exceed 1100° F.

The sieve bed, after charging with dry nitrogen to remove combustible products, was repressured to 50 p.s.i.g. in a manner similar to that described above. Flow of the 8 RVP gasoline was again started at a liquid hourly space velocity of 0.95 and a temperature of 100° F. Unexpectedly, a throughput of five was achieved before the effluent reached a mercaptan content of five p.p.m.

*Example 3*

The procedure of Example 2 was repeated using a bed of "13X" molecular sieves which had been subjected to several natural gas regenerations, except a mixture of 95% by weight 8 RVP natural gasoline and 5% by weight of the lubricating oil shown in Table II above was used to deposit the combustible material. As a result, the weight ratio of combustible material to sieves was only 0.3. The sieves were burned while the temperature of the hot spot was maintained at less than 1100° F.

The 8 RVP natural gasoline was again charged through the bed of sieves at a space velocity of 0.95 and a temperature of 100° F. Again only a throughput of 3.5 was achieved before an effluent containing more than five p.p.m. of mercaptan was obtained.

*Example 4*

A bed of "13X" molecular sieves was subjected to calcination at a temperature of 1000° F. for six hours by continuously flowing nitrogen through the sieves. Charging the 8 RVP gasoline whose properties are given in Table I above under the conditions described in Example 1 above resulted in essentially the same throughput before the effluent contained more than five p.p.m. of mercaptan sulfur. This example shows that heating of the sieves alone is not sufficient to cause an increase in the capacity of the sieves for mercaptans.

Resort may be had to such variations and modifications as fall within the spirit of the invention and the scope of the appended claims.

We claim:

1. A process for increasing the adsorptive capacity of zeolites for mercaptans which comprises burning said zeolites which contain a weight ratio of combustible material to zeolites of at least 0.4 to substantially burn off the combustible material thereon.

2. A process according to claim 1 wherein the temperature during burning is maintained below 1100° F.

3. A process according to claim 2 wherein the zeolites are synthetic zeolites which have substantially uniform channel diameters of at least 5° Angstrom.

4. A process according to claim 3 wherein the zeolites have a substantially uniform channel diameter of about 11 to 14° Angstrom.

5. A process for increasing the adsorptive capacity of zeolites for mercaptans which comprises depositing on said zeolites between 0.55 to 0.65 weight percent of a combustible material and thereafter burning said zeolites at a temperature less than 1100° F. to substantially burn off the combustible material thereon.

6. A process according to claim 5 wherein the combustible material comprises an organic material which is substantially non-volatile at 1000° F. and atmospheric pressure.

7. A process according to claim 6 wherein the combustible organic material is a lubricating oil.

8. A process for the selective adsorption of mercaptans from a petroleum fraction by contacting said petroleum fraction with zeolites which comprises depositing a combustible organic material on said zeolites so as to obtain a weight ratio of combustible organic material to zeolites of greater than 0.4, thereafter subjecting said zeolites to burning at a temperature less than 1100° F. to substantially burn off the combustible material thereon and thereafter passing said petroleum fraction through said zeolites.

9. A process according to claim 8 wherein the petroleum fraction boils between —65° and 400° F. and contains less than 12 percent unsaturated compounds.

10. A process according to claim 9 wherein the zeolite is a synthetic zeolite which has a substantially uniform diameter of between about 11° and 14° Angstrom.

11. A process according to claim 10 wherein the combustible organic material is a lubricating oil.

12. A process according to claim 8 wherein the zeolites are synthetic zeolites having a substantially uniform channel diameter of about 11 to 14° Angstrom.

13. A process according to claim 12 wherein the petroleum fraction is a petroleum fraction boiling between —65° and 400° F.

14. A process for increasing the adsorptive capacity of zeolites for mercaptans which comprises burning said zeolites which contain a weight ratio of combustible material to zeolites of between 0.5 and 0.8 at a temperature maintained below 1100° F. to substantially burn off the combustible material thereon, said zeolites having a substantially uniform channel diameter of about 11° to 14° Angstrom.

15. A process for increasing the adsorptive capacity of zeolites for mercaptans which comprises burning said zeolites which contain a weight ratio of combustible material to zeolites of between 0.4 and 0.8 to substantially burn off the combustible material thereon.

16. A process according to claim 15 wherein the temperature during burning is maintained below 1100° F.

17. A process according to claim 16 wherein the zeolites are synthetic zeolites which have substantially uniform channel diameters of at least 5° Angstrom.

18. A process according to claim 17 wherein the zeolites have a substantially uniform channel diameter of about 11° to 14° Angstrom.

19. A process for the selective adsorption of mercaptans from a petroleum fraction by contacting said petroleum fraction with zeolites which comprises depositing a combustible organic material on said zeolites so as to obtain a weight ratio of combustible organic material to zeolites of between 0.4 and 0.8, thereafter subjecting said zeolites to burning at a temperature maintained below 1100° F. to substantially burn off the combustible material thereon and thereafter passing said petroleum fraction through said zeolites.

20. A process according to claim 19 wherein the zeolites are synthetic zeolites having a substantially uniform channel diameter of about 11° to 14° Angstrom.

References Cited by the Examiner

UNITED STATES PATENTS

| 2,966,451 | 12/1960 | Caesar et al. | 208—26 |
| 3,051,646 | 8/1962 | Brooke | 208—250 |

ALPHONSO D. SULLIVAN, *Primary Examiner.*